(12) United States Patent
Kim et al.

(10) Patent No.: US 9,810,491 B2
(45) Date of Patent: Nov. 7, 2017

(54) CAN-TYPE HEAT EXCHANGER

(71) Applicants: HYUNDAI MOTOR COMPANY, Seoul (KR); KBAUTOTECH CO., LTD., Asan-si (KR)

(72) Inventors: Jae Yeon Kim, Hwaseong-si (KR); Joo Hyung Kim, Seoul (KR)

(73) Assignees: HYUNDAI MOTOR COMPANY, Seoul (KR); KBAUTOTECH CO., LTD., Asan-si (KR)

( * ) Notice: Subject to any disclaimer, the term of this patent is extended or adjusted under 35 U.S.C. 154(b) by 164 days.

(21) Appl. No.: 14/948,305

(22) Filed: Nov. 21, 2015

(65) Prior Publication Data

US 2016/0363398 A1    Dec. 15, 2016

(30) Foreign Application Priority Data

Jun. 15, 2015  (KR) .................. 10-2015-0084261

(51) Int. Cl.
*F28F 27/02* (2006.01)
*F28D 9/00* (2006.01)
(Continued)

(52) U.S. Cl.
CPC ............ *F28F 27/02* (2013.01); *F16K 31/002* (2013.01); *F28D 9/0006* (2013.01);
(Continued)

(58) Field of Classification Search
CPC .... F28F 3/08; F28F 3/086; F28F 3/044; F28F 3/046; F28F 9/001; F28F 9/002;
(Continued)

(56) References Cited

U.S. PATENT DOCUMENTS 1,870,809 A  *  8/1932  Handy ................... F01M 1/12
                                                              165/297
4,669,532 A       6/1987  Tejima et al.
(Continued)

FOREIGN PATENT DOCUMENTS

DE         2306426 A1 *  8/1974  ............. F01P 11/08
DE        10060102 A1    6/2001
(Continued)

*Primary Examiner* — Grant Moubry
*Assistant Examiner* — For K Ling
(74) *Attorney, Agent, or Firm* — Morgan, Lewis & Bockius LLP

(57) ABSTRACT

A can-type heat exchanger may include a housing having a space therein, integrally formed with a mounting portion, and a first inlet and a first outlet; a partition wall integrally formed to the housing, separating the space and the inside of the mounting portion, and forming a bypass passageway inside of the housing; a heat radiating unit inserted into the space, provided with connecting lines alternately formed by stacking a plurality of plates; a cover cap mounted at opened one surface of the housing, and a second inlet and a second outlet for communicating a second connecting line of the connecting lines; and a valve unit mounted at the first inlet formed in the mounting portion and penetrating the partition wall in the mounting portion, selectively opening and closing the space or the bypass passageway separated by the partition wall using linear displacement.

33 Claims, 11 Drawing Sheets

(51) Int. Cl.
*F28F 3/08* (2006.01)
*F28F 9/00* (2006.01)
*F28F 3/04* (2006.01)
*F16K 31/00* (2006.01)
*F28D 21/00* (2006.01)

(52) U.S. Cl.
CPC ............ *F28D 9/0037* (2013.01); *F28F 3/044* (2013.01); *F28F 3/046* (2013.01); *F28F 3/086* (2013.01); *F28F 9/002* (2013.01); *F28F 9/005* (2013.01); *F28D 2021/0089* (2013.01)

(58) Field of Classification Search
CPC .... F28F 9/005; F28F 9/22; F28F 27/02; F28F 2009/222; F28D 9/0006; F28D 9/0037; F28D 9/0043; F28D 2021/0087; F28D 2021/0089; F01P 2060/045; F01P 11/08; F01M 5/005; F01M 5/007; F16K 31/002
USPC ........................................................ 165/168
See application file for complete search history.

(56) References Cited

U.S. PATENT DOCUMENTS

| | | | | |
|---|---|---|---|---|
| 5,014,775 | A * | 5/1991 | Watanabe | B01D 35/18 123/196 AB |
| 6,182,749 | B1 * | 2/2001 | Brost | F01M 5/007 123/196 AB |
| 6,298,910 | B1 * | 10/2001 | Komoda | B23K 1/0012 165/133 |
| 6,799,631 | B2 * | 10/2004 | Acre | F28F 9/0214 123/41.09 |
| 7,004,237 | B2 * | 2/2006 | Mathur | F28D 9/0006 165/167 |
| 7,905,203 | B2 * | 3/2011 | Tawarada | F28D 9/0012 123/41.44 |
| 2003/0010479 | A1 | 1/2003 | Hayashi et al. | |
| 2004/0232249 | A1 * | 11/2004 | Brown | F01M 5/007 236/34.5 |
| 2006/0219394 | A1 | 10/2006 | Martin et al. | |
| 2007/0256822 | A1 * | 11/2007 | Komoda | F28D 9/0043 165/167 |
| 2010/0314084 | A1 * | 12/2010 | Takeuchi | F25B 37/00 165/166 |
| 2011/0024082 | A1 * | 2/2011 | Bharne | F28D 9/0012 165/95 |
| 2012/0061060 | A1 * | 3/2012 | Stoll | F01M 5/002 165/133 |
| 2014/0352921 | A1 * | 12/2014 | Chen | F28F 27/02 165/96 |
| 2015/0101781 | A1 | 4/2015 | Kim | |

FOREIGN PATENT DOCUMENTS

| | | | |
|---|---|---|---|
| DE | 102012113111 A1 | 12/2013 | |
| FR | 2800125 A1 * | 4/2001 | ............. F01P 7/165 |
| FR | 2853725 A1 * | 10/2004 | ............. F01M 5/005 |
| JP | 06229690 A * | 8/1994 | ........... F28D 9/0012 |
| JP | 2005-525505 A | 8/2005 | |
| JP | 2009-19868 A | 1/2009 | |
| JP | 2009-52849 A | 3/2009 | |
| JP | 2012-057889 A | 3/2012 | |
| KR | 1999-0068827 A | 9/1999 | |
| KR | 10-0417957 B1 | 2/2004 | |
| KR | 10-0600561 B1 | 7/2006 | |

* cited by examiner

CAN-TYPE HEAT EXCHANGER

CROSS-REFERENCE TO RELATED APPLICATION

The present application claims priority to and the benefit of Korean Patent Application No. 10-2015-0084261 filed on Jun. 15, 2015, the entire contents of which is incorporated herein for all purposes by this reference.

BACKGROUND OF THE INVENTION

Field of the Invention

The present invention relates to a can-type heat exchanger. More particularly, the present invention relates to a can-type heat exchanger that is capable of controlling a temperature by allowing respective operating fluids to be introduced therein and flow therein, and selectively heat-exchanging the respective operating fluids with each other depending on temperatures of the introduced operating fluids, improve heat-exchange efficiency, and have reduced weight and size.

Description of Related Art

A heat exchanger transfers heat from a high-temperature fluid to a low-temperature fluid through a heat transfer surface, and is used in a heater, a cooler, an evaporator, and a condenser.

A heat exchanger re-uses heat energy or controls a temperature of operating fluids flowing therein for demanded performance. The heat exchanger is applied to an air conditioning system or a transmission oil cooler of a vehicle, and is mounted in an engine compartment.

Since it is difficult to mount the heat exchanger in the engine compartment having restricted space, studies on heat exchangers with smaller size, lighter weight, and higher efficiency have been developed.

A conventional heat exchanger controls the temperatures of the operating fluids according to a condition of a vehicle, and supplies the operating fluids to an engine, a transmission, or an air conditioning system. For this purpose, bifurcation circuits and valves are mounted on each hydraulic line through which the operating fluids operated as heating media or cooling media pass. Therefore, constituent elements and assembling processes are increased and layout is complicated.

If additional bifurcation circuits and valves are not used, heat exchanging efficiency cannot be controlled according to a flow amount of the operating fluids. Therefore, the temperature of the operating fluids cannot be controlled efficiently.

Further, according to a conventional heat exchanger, size of the heat exchanger should be increased to improve heat-exchange efficiency. Further, additional valves for controlling flow of operating fluids should be mounted outside, thus constituent elements are complicated and weight and cost are increased. Accordingly, when the heat exchanger is mounted in the engine compartment, layout is complicated and mounting space of the elements is not sufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a can-type heat exchanger having advantages of simultaneously warming and cooling operating fluids according to temperatures or flow amounts of the operating fluids in a running state or an initial starting condition of the vehicle when the operating fluids are heat exchanged with each other in the can-type heat exchanger through a valve unit operated by the temperature of the operating fluids.

An exemplary embodiment of the present invention provides a can-type heat exchanger, including: a housing of which one surface is opened and a second surface is closed and having a space therein, integrally formed with a mounting portion provided in a lateral side and communicated with the space, and a first inlet and a first outlet provided in the mounting portion and the lateral side thereof; a partition wall integrally formed to the housing, separating the space and the inside of the mounting portion, connected to the first inlet and the first outlet, and forming a bypass passageway inside of the housing; a heat radiating unit inserted into the space, provided with connecting lines alternately formed by stacking a plurality of plates, one connecting line of the connecting lines communicating with the space, and where the operating fluids are heat-exchanged with each other while passing through the respective connecting lines; a cover cap mounted at one opened surface of the housing so that the heat radiating unit integrally mounted on one surface thereof to the space, and a second inlet and a second outlet for communicating with a second connecting line of the connecting lines are formed at the one surface; and a valve unit that is mounted at the first inlet formed in the mounting portion and penetrating the partition wall in the mounting portion, selectively opening and closing the space or the bypass passageway separated by the partition wall using linear displacement which is generated when expansion and contraction occur according to the temperature of the coolant flowing from the first inlet, and adjusting flow of the operating fluids.

A coupling portion may be integrally formed with an exterior circumference of the cover cap to be bent toward the housing.

The coupling portion may be clinching-coupled to the housing in a state that an interior circumference thereof is surrounded by an exterior circumference of the housing.

A seal ring may be disposed between the housing and the cover cap.

The first inlet and the first outlet may be respectively formed at a position intersecting the second inlet and the second outlet.

The plate may be formed with a disk shape corresponding to the housing, and a side corresponding to the partition wall is formed with a linear shape.

First and second connecting holes may be formed to the plate corresponding to the second inlet and the second outlet.

The heat radiating unit may further include: a first fixing plate being mounted to one surface of the heat radiating unit which is fixed to the cover cap and forming first and second penetration holes which are formed to correspond with the first and second connecting holes; and a second fixing plate mounted with a second surface of the heat radiating unit which is inserted into the space.

The plate may include: a plurality of protrusions protruded from the plate to be disposed apart from each other by a set interval; and a distributing protrusion formed from the center of the plate to an exterior circumference of the plate to be disposed between the first inlet and the first outlet.

The protrusion may be formed with a hemisphere shape and is protruded from the plate in a same direction as the distributing protrusion.

The valve unit may include: an outer case inserted into the first inlet from outside of the mounting portion, the outer case including a fixing portion of which a mounting groove is integrally formed to an interior surface of the first inlet thereof, and is mounted to an external side of the mounting portion at an opposite side of the first inlet, an insert portion integrally formed to the fixing portion, at least one first opening hole formed along a length direction corresponding to the space separated by the partition wall, and at least one bypass hole formed corresponding to the bypass passageway; a fixing rod which is inserted into the outer case and of which a first end is fixedly mounted to the mounting groove of the fixing portion; a deformable member inserted to the fixing rod, and moved on the fixing rod by expansion or contraction according to a change of temperature of the operating fluid; an inner case of which at least one second opening hole is formed along a length direction thereof corresponding to the first opening hole of the outer case, and which is slidably inserted into the outer case; a flange member which is fixed to a first end of the inner case therein, and fixed to the lower portion of the deformable member; a stopper fixed to the insert portion from an opposite side of the fixing portion of the outer case; and an elastic member disposed between the deformable member and the stopper, that is compressed when the deformable member is expanded, and that supplies elastic force to the deformable member.

The fixing portion of the outer case may be fixed to an end cap, which is mounted to the mounting portion on an external surface of the fixing portion.

The outer case may be formed with a cylinder shape of which a first end is opened.

The bypass hole and the first opening hole may be formed apart from each other along the length direction of the outer case at a predetermined angle.

The first opening holes may be formed apart from the bypass hole at the lower portion of the outer case along the length direction of the outer case toward the fixing portion.

The inner case may be formed with a cylinder shape of which both ends are opened.

The second opening holes may be formed to be misaligned along the length direction of the inner case at a predetermined angle from each other.

The inner case may be moved toward the first inlet by expansion of the deformable member in the outer case so that the second opening hole is positioned at the first opening hole to open the first opening hole and close the bypass hole by the inner case.

The inner case may be initially assembled as the first opening hole is closed by the inner case and the second opening hole is closed by the outer case.

A deformable material filled within the deformable member may be made of a wax material which is expanded or contracted according to the temperature of the operating fluid.

Flowing holes may be formed to the exterior circumference of the flange member with a predetermined angle.

The exterior circumference of the flange member may be fixed to the interior circumference of the inner case, and a connecting portion formed to the center thereof is fixed to the deformable member through the fixing ring.

At least one Inflow hole may be formed to the stopper for the operating fluid flowing through the first inlet to flow within the valve unit.

The inflow holes may be formed to the center and along the circumference of the stopper.

A fixing end may be formed to protrude to the stopper for the elastic member to be fixed at the stopper.

The receiving end, where the stopper is received, may be formed to an interior circumference of the insert portion of the outer case.

A ring groove may be formed to the interior circumference of the outer case for a stopper ring to be received thereto for fixing the stopper.

One of operating fluids may be a coolant flowing from a radiator, and another one of operating fluids may be transmission oil from an automatic transmission.

The coolant may be flowed to the heat radiating unit through the first inlet and the first outlet, the transmission oil is flowed to the heat radiating unit through the second inlet and the second outlet, and the connecting lines may include a first connecting line in which the coolant flows and a second connecting line in which the transmission oil flows.

A first end of the partition wall positioned at the space may be bent at a predetermined angle from a second end of the partition wall positioned at the mounting portion.

A penetration hole may be formed at a first end portion of the partition wall corresponding to the heat radiating unit.

The housing may be formed with a cylinder shape, and may be made of a plastic material through injection molding.

The cover cap may be made of a metal material, and the heat radiating unit is integrally mounted to the cover cap by brazing.

According to the present invention, the can-type heat exchanger warms or cools operating fluids according to temperatures or flow amounts of the operating fluids flowing in a running state or an initial starting condition of the vehicle when the operating fluids are heat exchanged with each other in the can-type heat exchanger through the valve unit operated by the temperature of the operating fluids.

Further, it is possible to control the temperature of the operating fluids by an operation of the valve unit according to the vehicle condition. Since the can-type heat exchanger can control the temperature of the operating fluids and is formed with a can shape that can improve efficiency of heat exchange and reduce weight and size, and it is possible to simplify an engine layout. Therefore, it may be easy to obtain a mounting space and thereby installability may be improved.

The valve unit applied with the deformable member such as the wax material which is expanded or contracted according to the flowed operating fluid may selectively supply the operating fluids, thus flow of the operating fluids may be correctly controlled.

Since the valve unit is mounted as the can-type heat exchanger, additional control valves and bifurcation circuits for controlling flow of the operating fluids may be eliminated. Therefore, manufacturing cost may be reduced and workability may be improved.

Further, manufacturing and assembly work may be simple, manufacturing cost may be reduced, and productivity may be improved as the cover cap of which the heat radiating unit is integrally mounted thereto is coupled with the housing which is manufactured by injection molding.

Furthermore, a defective complete product may not be produced such that commercial value is improved by checking whether a defective heat radiating unit is produced before the cover cap is assembled therewith, and valve responsiveness of opening and closing according to the temperature of the operating fluids is improved.

If the operating fluid is the transmission oil in the automatic transmission, hydraulic friction during cold starting may be lowered due to fast warm-up. In addition, slip may be prevented and durability may be maintained while driving due to excellent cooling performance. Therefore, fuel economy and durability of the transmission may be improved.

The methods and apparatuses of the present invention have other features and advantages which will be apparent from or are set forth in more detail in the accompanying drawings, which are incorporated herein, and the following Detailed Description, which together serve to explain predetermined principles of the present invention.

Figure 1:
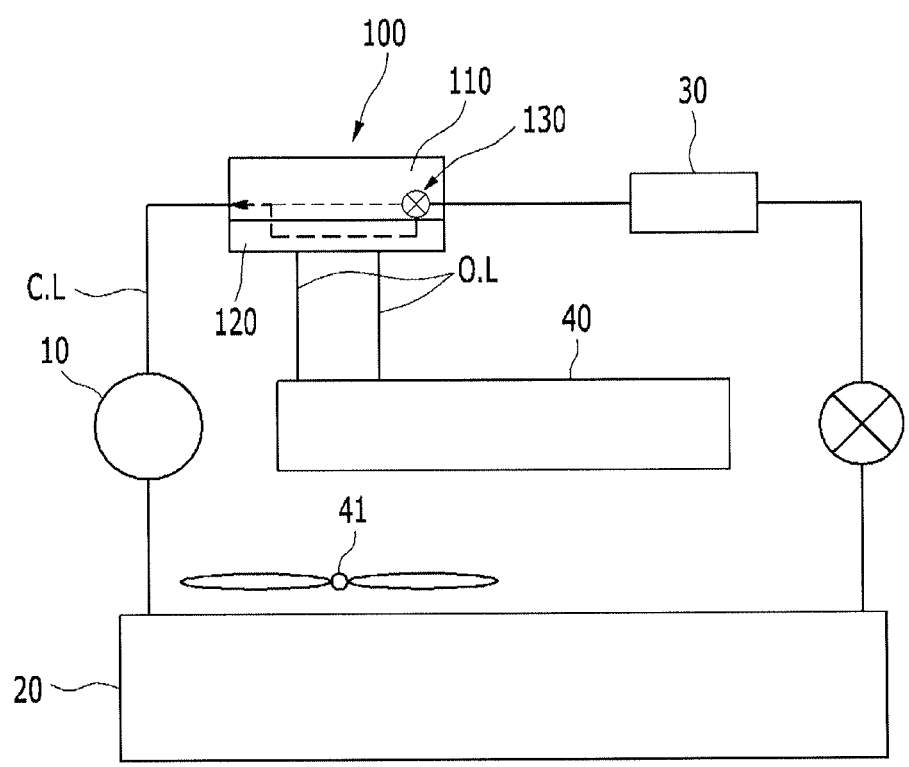
FIG. 1 is a schematic diagram of a cooling system of an automatic transmission to which a can-type heat exchanger according to an exemplary embodiment of the present invention is applied.

It should be understood that the appended drawings are not necessarily to scale, presenting a somewhat simplified representation of various features illustrative of the basic principles of the invention. The predetermined design features of the present invention as disclosed herein, including, for example, predetermined dimensions, orientations, locations, and shapes will be determined in part by the particular intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but further various alternatives, modifications, equivalents and other embodiments, which is/are included within the spirit and scope of the invention as defined by the appended claims.

An exemplary embodiment of the present invention will hereinafter be described in detail with reference to the accompanying drawings.

First, since the exemplary embodiment described in the specification and the configurations shown in the drawings are merely the most preferable exemplary embodiment and configurations of the present invention, they do not represent all of the technical ideas of the present invention, and it should be understood that that various equivalents and modified examples, which may replace the exemplary embodiments, are possible when filing the present application.

To clearly describe the present invention, parts that are irrelevant to the description are omitted, and identical or similar constituent elements throughout the specification are denoted by a same reference numerals.

Since the size and thickness of each configuration shown in the drawings are arbitrarily shown for convenience of description, the present invention is not necessarily limited to configurations illustrated in the drawings, and to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 is a schematic diagram of a cooling system of an automatic transmission to which a can-type heat exchanger according to an exemplary embodiment fo the present invention is applied.

Referring to FIG. 1, a can-type heat exchanger 100 according to an exemplary embodiment of the present invention applies to a cooling system of an automatic transmission.

As shown in FIG. 1, the cooling system of the automatic transmission is provided with a cooling line for cooling an engine. A coolant passes through a radiator 20 having a cooling fan 41 through a water pump 10 and is cooled by the radiator 20. A heater core 30 connected to a heating system of the vehicle is mounted at the cooling line C.L.

The can-type heat exchanger 100 according to an exemplary embodiment of the present invention warms or cools operating fluids according to temperatures or flow amounts of the operating fluids flowing in a running state or an initial starting condition of the vehicle when the operating fluids are heat exchanged with each other in the can-type heat exchanger 100 through a valve unit 130 operated by the temperature of the operating fluids.

The can-type heat exchanger 100 according to an exemplary embodiment of the present invention is disposed between the water pump 10 and the heater core 30, and is connected to an automatic transmission 40 through an oil line (hereinafter "O.L")

In the exemplary embodiment of the present, the operating fluids include a coolant flowing from the radiator 20 and transmission oil flowing from the automatic transmission 40. The can-type heat exchanger 100 causes the transmission oil to exchange heat with the coolant such that temperatures of the transmission oil and the engine oil are controlled.

Figure 2:
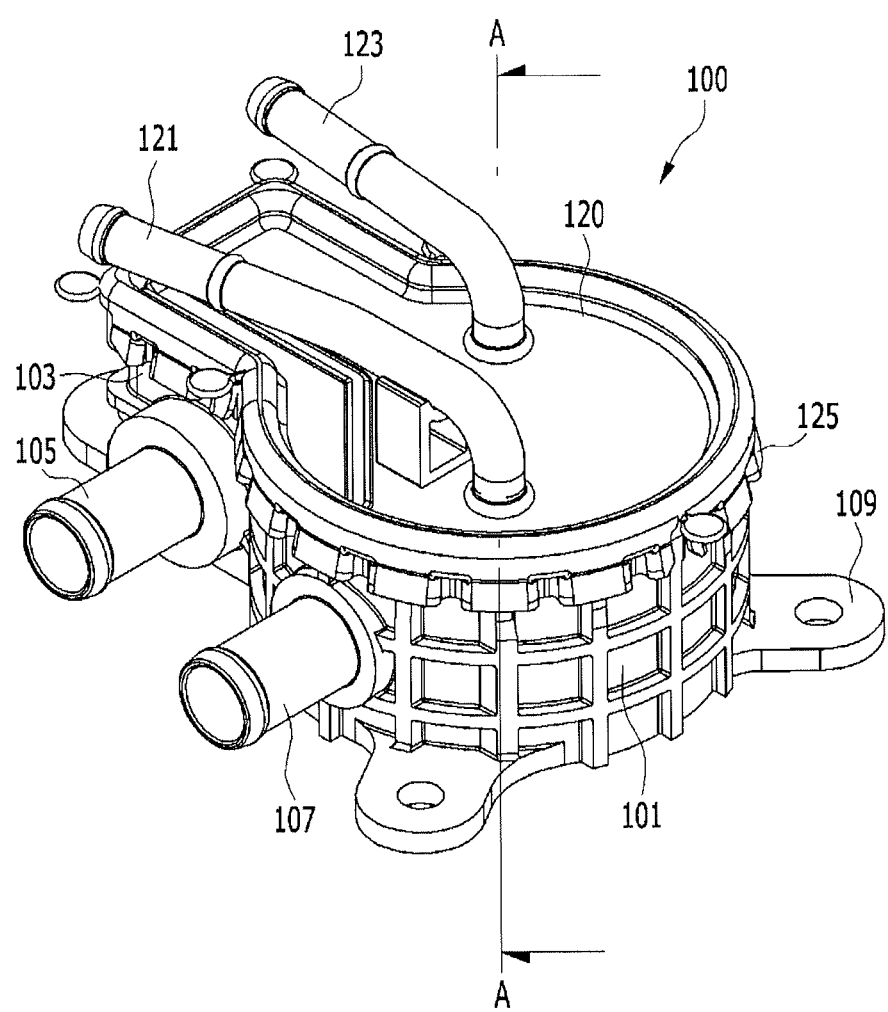
FIG. 2 is a perspective view of a can-type heat exchanger.
Figure 3:
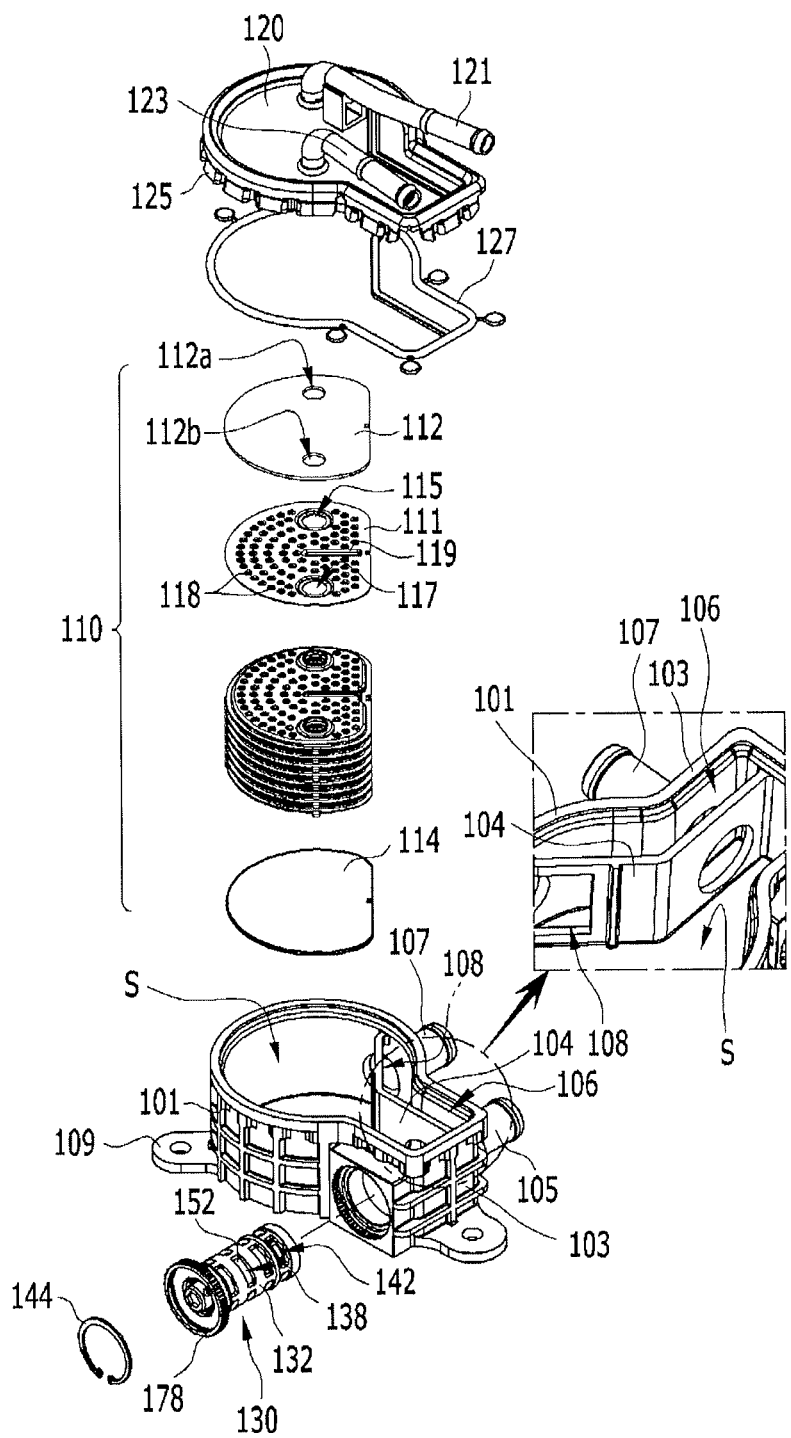
FIG. 3 is an exploded perspective view of a can-type heat exchanger according to an exemplary embodiment of the present invention.
Figure 4:
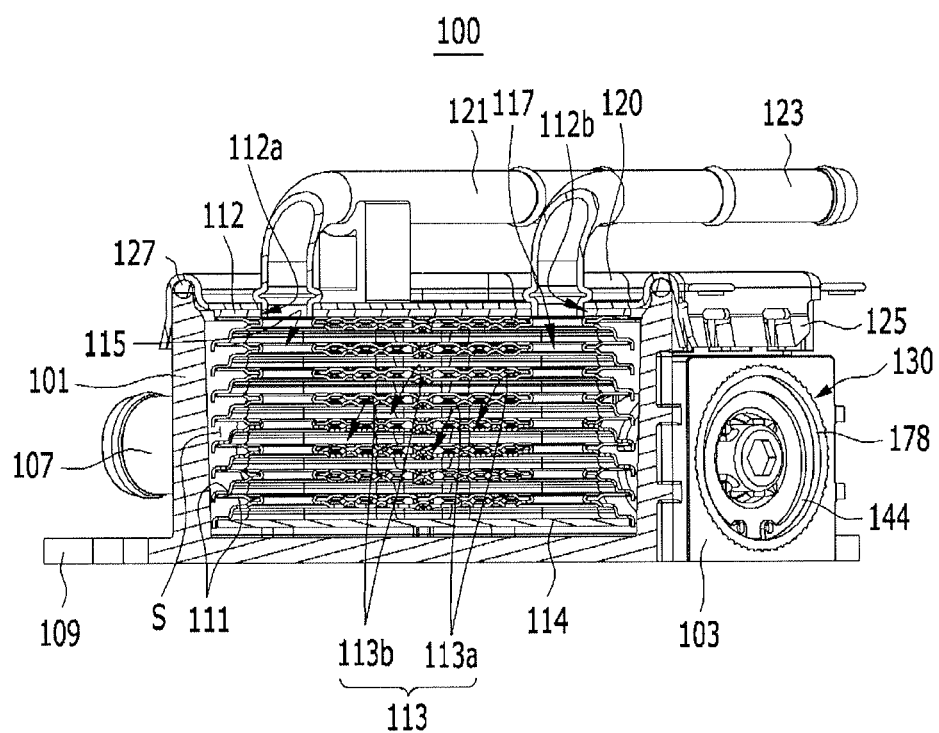
FIG. 4 is a cross-sectional view taken along the line A-A of FIG. 2.
Figure 5:
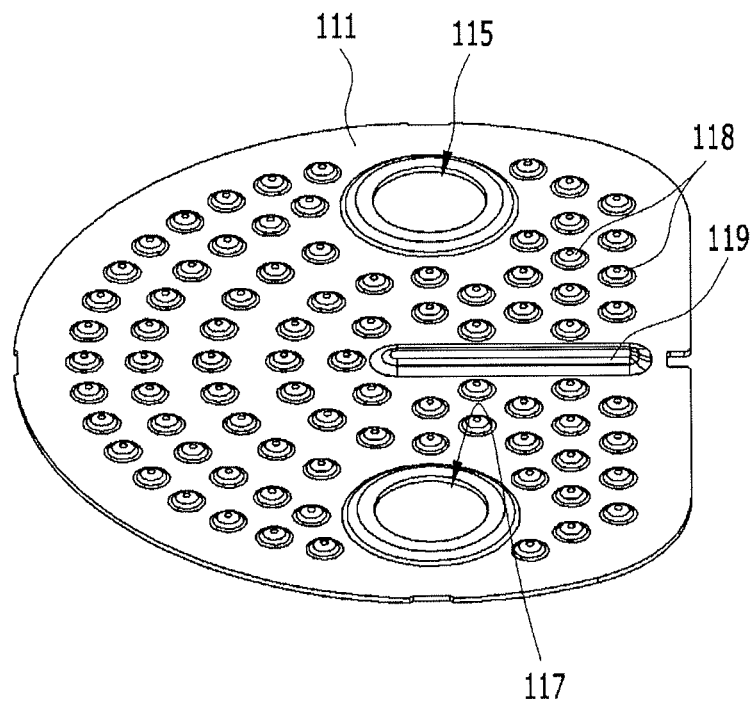
FIG. 5 is a perspective view of a plate of a heat radiating unit applied to a can-type heat exchanger according to an exemplary embodiment of the present invention.

FIG. 2 and FIG. 3 are a perspective view and an exploded perspective view of the can-type heat exchanger according to an exemplary embodiment of the present invention, FIG. 4 is a cross-sectional view taken along the line A-A of FIG. 2, and FIG. 5 is a perspective view of a plate of a heat radiating unit applied to a can-type heat exchanger according to an exemplary embodiment of the present invention.

As shown in FIG. 2 to FIG. 4, in an exemplary embodiment of the present invention, the can-type heat exchanger 100 may include a housing 101, a partition wall 104, a heat radiating unit 110, a cover cap 120, and the valve unit 130.

The housing 101 is formed to be cylindrical, with a side closed and a second side opened, such that a space S is formed in the housing 101.

Meanwhile, the housing 101 may be formed with a polygon shape including a cylinder shape.

A mounting portion 103 connecting to the space S is integrally formed at a lateral side of the housing 101, and a first inlet 105 and a first outlet 107 are formed at the mounting portion 103 and the lateral side of the housing 101.

Here, the housing 101 is made of a plastic material through injection molding.

Further, at least one engaging portion 109 may be formed with a second surface circumference of the housing 101.

The engaging portion 109 is for mounting the can-type heat exchanger 100 inside an engine compartment, and in the present exemplary embodiment, three engaging portions 109 are formed at positions spaced apart from each other around an exterior circumference of the housing 101 at a set angle.

In the present exemplary embodiment, the three engaging portions 109 are formed at positions spaced apart from each other around an exterior circumference of the housing 101 at a set angle are described as an exemplary embodiment, but the present invention is not limited thereto, and the size, the number, and the positions of the engaging portion 109 may be modified and applied.

The partition wall 104 is integrally formed to the housing 101, separating the space S and the inside of the mounting portion 103, and is connected to the first inlet 105 of the mounting portion 103 and the first outlet 107 of the lateral side of the housing 101. The partition wall 104 provides a bypass passageway 106 inside of the housing 101.

To separate a part of the space S, a first end of the partition wall 104 positioned at the space S may be bent at a predetermined angle from a second end of the partition wall 104 positioned at the mounting portion 103.

A first end of the partition wall 104 may be rounded at a second end of the partition wall 104 by a set curvature.

A penetration hole 108 may be formed at a first end portion of the partition wall 104 corresponding to the heat radiating unit 110.

The penetration hole 108 connects between the space S and the first outlet 107, such that the coolant exhausts outside of the can-type heat exchanger 100 after the coolant flowing into the space S separated by the partition wall 104 passes through the heat radiating unit 110 according to operation of the valve unit 130.

That is, the coolant passing through the heat radiating unit 110 is exhausted to the bypass passageway 106 through the penetration hole 108 of the partition wall 104, and is exhausted outside of the housing 101 through the first outlet 107.

As shown in FIG. 3 to FIG. 4, in the present exemplary embodiment, the heat radiating unit 110 is inserted into the space S and is provided with connecting lines 113 that are alternately formed by stacking a plurality of plates 111.

One connecting 113 line of the connecting lines 113 communicates with the space S, and the operating fluids are heat-exchanged with each other while passing through the respective connecting lines 113.

The heat radiating unit 110 is integrally mounted on one surface of the cover cap 120 corresponding to the space S.

The cover cap 120 is mounted at one opened surface of the housing 101, and a second inlet 121 and a second outlet 123 for communicating with a second connecting line 113 of the connecting lines 113 are formed at the one surface of the cover cap 130.

Here, the cover cap 120 is made of a metal material, and the heat radiating unit 110 is integrally mounted to the cover cap 130 by brazing.

That is, the heat radiating unit 110 is assembled with the cover cap 120 before the cover cap 120 is mounted to the housing 101.

Accordingly, the heat radiating unit 110 may be prevented from having operating defects by pre-inspecting leakage of operating fluids inflowed from the connecting line 113, which communicates with the second inlet 121 and the second outlet 123.

Meanwhile, the second inlet 121 and the second outlet 123 may be formed at one surface of the cover cap 120 to be spaced apart.

That is, the second inlet 121 and the second outlet 123 are respectively formed at a position intersecting the first inlet 103 and the first outlet 105.

Accordingly, the coolant may flow into the space S and the heat radiating unit 110 through the first inlet 103 and the first outlet 105. The transmission oil flows into the heat radiating unit 110 through the second inlet 121 and the second outlet 123.

The cover cap 120 includes a coupling portion 135. A first end of a coupling portion 125 is integrally formed with an exterior circumference of the cover cap 120, and a second of the coupling portion 125 is bent toward the housing 101.

The coupling portion 125 is coupled to the housing 101 by clinching an exterior circumference thereof in a state that an interior circumference thereof is surrounded by an exterior circumference of the housing 101.

That is, the cover cap 120 is strongly connected to the housing 101 by repeatedly clinching an exterior circumference of the coupling portion 125.

In the present exemplary embodiment, a seal ring 127 may be disposed between the housing 101 and the cover cap 120.

The seal ring 127 seals between the space S and the cover cap 120 to prevent the coolant flowing into the space S from leaking to the outside of the housing 101.

One connecting line 113 of the connecting lines 113 communicates with the space S, and the coolant and the transmission oil supplied from the first and second inlets 105 and 121 are heat-exchanged with each other in the heat radiating unit 110 while passing through the respective connecting lines 113.

That is, when the transmission oil flows from the second inlet 121 and circulates in the heat radiating unit 110, the transmission oil and the coolant flowing into the space S of the housing 101 through the first inlet 105 flow in opposite directions to each other by counterflow of the transmission oil and the coolant.

The connecting line 113 may include a first connecting line 113a through which the coolant flows into the space S, and a second connecting line 113b in which the transmission oil flows.

The plate 111 may be formed with a disk shape corresponding to the housing 101, and a side of the plate 111 may be formed with a linear shape corresponding to the partition wall 104.

Further, first and second connecting holes 115 and 117 are formed to the plate 111 corresponding to the second inlet 121 and the second outlet 123.

The transmission oil flowing from the second inlet 121 flows into the heat radiating unit 110 through the first connecting hole 115, passes through the second connecting line 113b, and exhausts to the second outlet 123 through the second connecting hole 117.

Meanwhile, as shown in FIG. 5, the plate 111 may include a plurality of protrusions 118 and a distributing protrusion 119. The plurality of protrusions 118 are protruded from the plate 111 to be disposed apart from each other by a set interval. The distributing protrusion 119 is formed from the center of the plate 111 to an exterior circumference of the plate 111 to an exterior circumference toward the partition wall 104.

Each of the protrusions 118 may be formed with a hemispherical shape, may protrude from the plate 111 in a same direction as the distributing protrusion 119, and may be formed in plural from the center of the plate 111 to the exterior circumference in a circumference direction.

When the plates 111 are stacked, the protruded parts of the protrusion 118 and the distributing protrusion 119 are connected with each other.

Since two assembled plates 111 of which each protrusion 118 contacts each distributing protrusion 119 are stacked in plural, the first connecting line 113a and the second connecting line 113b are alternately formed.

Here, the protrusion 118 generates flow resistance to the coolant passing through the first connecting line 113a of the heat radiating unit 110 and the transmission oil passing through the second connecting line 113b, such that heat exchange efficiency is improved.

Further, the distributing protrusion 119 evenly distributes flow of each operating fluid to increase a flow distance of the transmission oil and the coolant flow passing through the first and second connecting lines 113a and 113b, such that each operating fluid evenly flows by the entire region of the plate 111 of the heat radiating unit 110.

The heat radiating unit 110 further includes first and second fixing plates 112 and 114.

The first fixing plate 112 is mounted to one surface of the heat radiating unit 110 which is fixed to the cover cap 120, and has first and second penetration holes 112a and 112b which are formed to correspond to the first and second connecting holes 115 and 117.

The second fixing plate 114 is mounted with a second surface of the heat radiating unit 110 which is inserted into the space S.

Here, the second fixing plate 114 prevents leakage of the transmission oil inflowed through the first and second connecting holes 115 and 117 by closing the first and second connecting holes 115 and 117 formed at the plate 111 on a second surface of the heat radiating unit 110.

Meanwhile, in the present exemplary embodiment, the coolant flows in and is exhausted through the first inlet 105 and the first outlet 107, respectively, and flows in the first connecting line 113a at an inside of the space S. The transmission oil flows in the second connecting line 113b through the second inlet 121. However, flow of the coolant and the transmission oil may be changed.

A first end portion of the valve unit 130 is mounted at the inside of the mounting portion 103 to penetrate the partition wall 104 corresponding to the first inlet 105 which is formed in the mounting portion 103.

The valve unit 130 selectively opens and closes the space S separated by the partition wall 104 or the bypass passageway 106 separated by the partition wall 104 using linear displacement which is generated when expansion and contraction occur according to the temperature of the coolant flowing from the first inlet 105. Therefore, the flow of the coolant may be adjusted.

Figure 6:
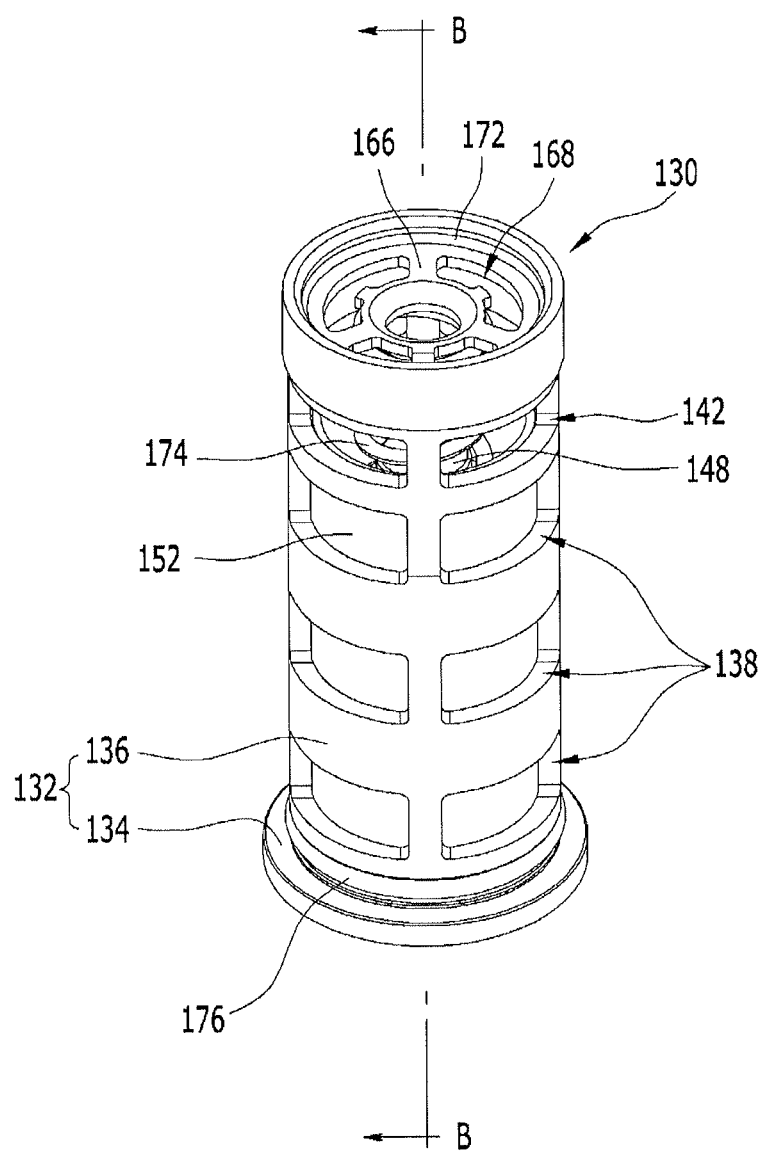
FIG. 6 a perspective view of a valve unit applied to a can-type heat exchanger according to an exemplary embodiment of the present invention.
Figure 7:
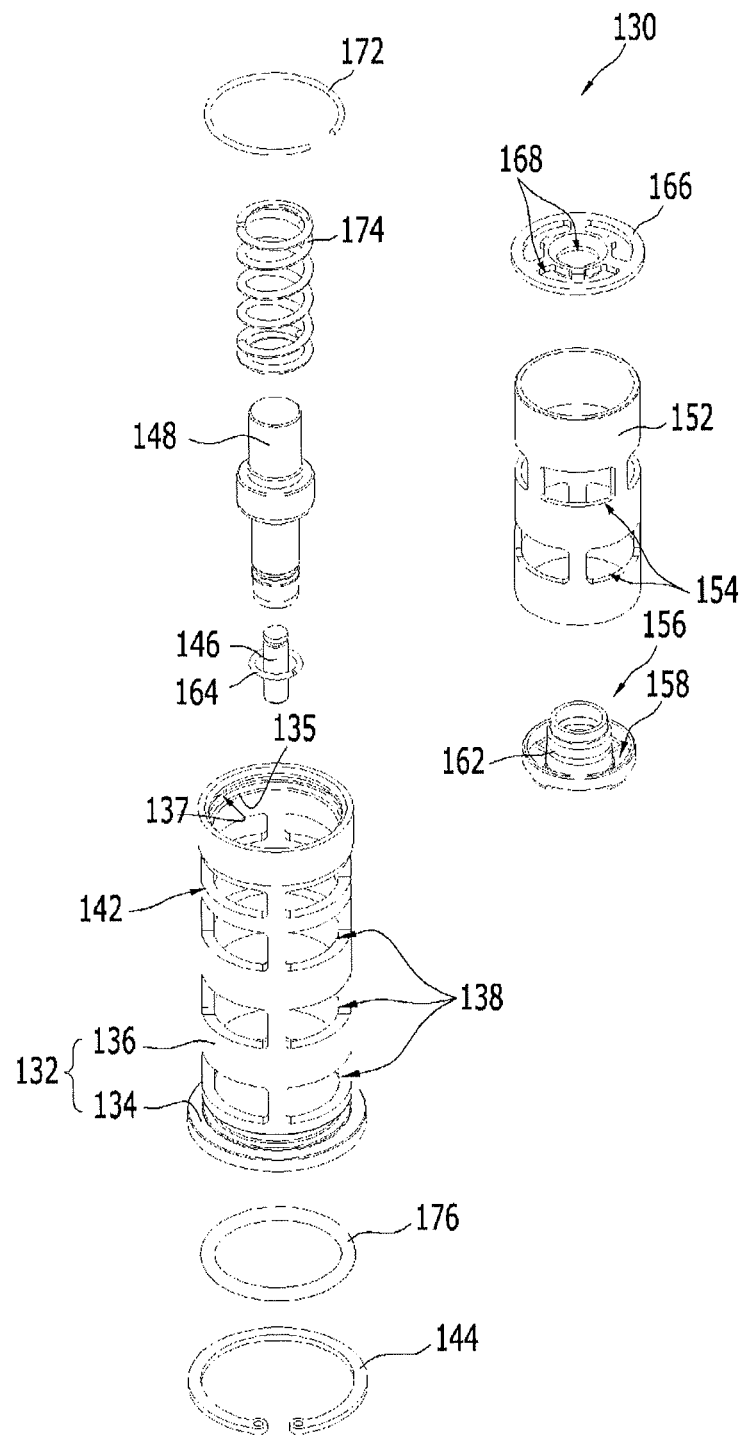
FIG. 7 is an exploded perspective view of a valve unit applied to a can-type heat exchanger according to an exemplary embodiment of the present invention.
Figure 8:
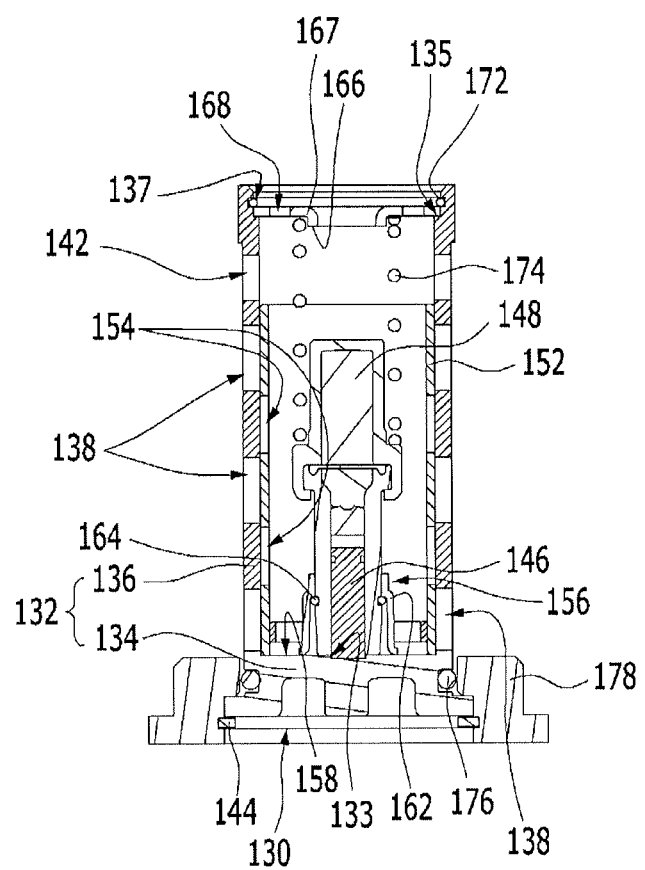
FIG. 8 is a cross-sectional view taken along the line B-B of FIG. 6.

FIG. 6 is a perspective view of a valve unit applied to a can-type heat exchanger according to an exemplary embodiment of the present invention, FIG. 7 is an exploded perspective view of a valve unit applied to a can-type heat exchanger according to an exemplary embodiment of the present invention, and FIG. 8 is a cross-sectional view taken along the line B-B of FIG. 6.

As shown in FIG. 6 to FIG. 8, the valve unit 130 includes an outer case 132, a fixing rod 146, a deformable member 148, an inner case 152, a flange member 156, a stopper 166, and an elastic member 174.

The outer case 132 is inserted toward the first inlet 105 from outside of the mounting portion 103.

The outer case 132 includes a fixing portion 134 of which a mounting groove 133 is integrally formed to an interior surface of the first inlet 105 thereof, and is mounted to an external side of the mounting portion 103 at an opposite side of the first inlet 105, and an insert portion 136 integrally formed to the fixing portion 134 toward the first inlet 105.

The insert portion 136 may be formed with a cylinder shape. At least one first opening hole 138 is formed along a length direction of the insert portion 136 corresponding to the space S which is separated by the partition wall 104. At least one bypass hole 142 is formed to the insert portion 136 corresponding to the bypass passageway 106.

Here, the first opening hole 138 and the bypass hole 142 are formed apart from each other along the length direction of the outer case 132 with a predetermined angle. In the present exemplary embodiment, 4 bypass holes 142 and the first opening holes 138 are formed at 90° from adjacent bypass holes 142 or first openings holes 138 along the exterior circumference of the insert portion 136, but are not limited thereto.

Further, the first opening holes 138 are formed apart from the bypass holes 142 at the lower portion of the outer case 132 along the length direction of the outer case 132 toward the fixing portion 134.

The fixing portion 134 of the outer case 132 is fixed to an end cap 178, which is mounted to the mounting portion 103 by insert molding, through a snap ring 144 that is mounted an external surface of the fixing portion 134.

Further, the outer case 132 may be formed with a cylinder shape of which the a first end of the insert portion 136 is opened toward the first inlet 105.

In the present exemplary embodiment, the fixing rod 146 is inserted into the outer case 132, and a first end thereof is fixedly mounted to the mounting groove 133 of the fixing portion 134.

The fixing rod 146 is mounted to the mounting groove 133 of the fixing portion 134 such that a second end thereof is extended toward the first inlet 105 perpendicular to the fixing portion 134.

The deformable member 148 is inserted into a second end portion of the fixing rod 146, and the position of the deformable member 148 is changed forward and rearward on the fixing rod 146 according to expansion or contraction of a deformable material filled within the deformable member 148 affected by the temperature of the operating fluid.

The deformable material filled within the deformable member 148 may be made of a wax material which is expanded or contracted according to the temperature of the operating fluid.

The wax material or wax element is a thermal expansion material that changes volume according to the temperature.

The deformable member 148 is an assembly filled with the wax material. When the volume of the wax material is changed according to the temperature, the deformable member 148 is moved forward or rearward on the fixing rod 146 without a change of appearance.

If the coolant with relatively high temperature flows through the first inlet 105, the deformable member 148, by the expansion of the wax material filled therein according to an increment of temperature, moves forward on the fixing rod 146.

On the contrary, when the coolant with a relatively low temperature flows through the first inlet 105, the deformable member 148, by the contraction of the wax material filled therein according to a decrement of temperature, moves rearward on the fixing rod 146.

If the coolant with a relatively low temperature flows through the first inlet 105 when the deformable member 148 is positioned at an initial state, the deformable member 148 is not moved forward or rearward because the volume of the wax material is not changed.

In the present exemplary embodiment, at least one second opening hole 154 is formed to the inner case 152 along the length direction thereof corresponding to the first opening 138 of the outer case 132, and the inner case 152 is slidable in the outer case 132.

Here, the inner case 152 is formed with a cylinder shape of which both ends are opened.

The second openings holes 154 are formed misaligned along the length direction of the inner case 152 corresponding to the first opening hole 138 with a predetermined angle from each other.

In the drawings, 4 second openings holes 154 are formed to an upper and lower portion of the exterior circumference of the inner case 152 at 90$^{\circ}$ from adjacent second openings 154, but are not limited thereto.

In the present exemplary embodiment, the flange member 156 is connected to the interior circumference of the inner case 152, and a center of which is fixed to the lower portion of the deformable member 148.

Here, the flange member 156 may be integrally formed with the inner case 152, is slidable within the outer case 132, and is fixed to the lower portion of the deformable member 148.

Flowing holes 158 may be formed to the exterior circumference of the flange member 156 at a predetermined angle.

For example, 4 flowing holes 158 may be formed to the exterior circumference of the flange member 156 at 90e, and the coolant flowing through the first inlet 105 may flow to the first connecting line 113a of the heat radiating unit 110 via an inner side of the inner case 152, the flowing hole 158, and the second opening hole 154.

The exterior circumference of the flange member 156 is fixed to the interior circumference of the inner case 152, and a connecting portion 162 formed to the center thereof is fixed to the deformable member 148 through a fixing ring 164.

In the present exemplary embodiment, the inner case 152 moves forward with the deformable member 148 within the outer case 132 by the flange member 156 when the deformable member 148 expands.

In this case, the second opening hole 154 of the inner case 152 is positioned corresponding to the first opening holes 138 to open the first opening holes 138 and the upper portion of the inner case 152 closes the bypass hole 142.

The inner case 152 may be assembled at the first time as the second opening hole 154 is closed by a closed section between the first opening holes 138 and thus the first opening holes 138 are closed, and the upper portion of the inner case 152 is positioned under the bypass hole 142 to open the bypass hole 142.

In the present exemplary embodiment, the stopper 166 is fixed to the insert portion 136 from the opposite side of the fixing portion 134 of the outer case 132.

At least one inflow hole 168 may be formed to the upper surface of the stopper 166 for the coolant flowing through the first inlet 105 to flow within the valve unit 130 to transform the deformable member 148.

In the drawings, the inflow holes 168 are formed to the center of the stopper 166 and 3 inflow holes 168 are formed along the circumferential direction at 120$^{\circ}$, but they are not limited thereto.

That is, the stopper 166 is mounted to the a first end of the insert portion of the outer case 132 and coolant flowing through the first inlet 105 flows in the outer case 132.

Meanwhile, the receiving end 135 where the stopper 166 is received is formed to the upper portion of the outer case 132.

The receiving end 135 is formed along the interior circumference of the outer case 132 and protrudes toward the center of the outer case 132.

A ring groove 137 is formed to the upper and interior circumference of the outer case 132 for a stopper ring 172 to be received thereto for fixing the upper portion of the stopper 166.

The stopper 166 is disposed to the receiving end 135 of the outer case 132 and is fixed by the stopper ring 172 mounted to the ring groove 137.

The elastic member 174 is interposed between the deformable member 148 and the stopper 166, is compressed when the deformable member 148 is expanded, and thereby supplies elastic force to the deformable member 148.

A first end of the elastic member 174 is supported by the stopper 166 and a second end thereof is supported by the deformable member 148, and the elastic member 174 may be a coil spring.

Thus, the elastic member 174 is compressed when the deformable member 148 moves forward on the fixing rod 146.

On the contrary, when the deformable member 148 is compressed, compression of the elastic member 174 is released and the elastic member 174 supplies elastic force to the deformable member 148 such that the deformable member 148 rapidly returns to the original position.

A fixing end 167 is formed to protrude to the stopper 166 for the elastic member 174 to be fixed under the stopper 166.

A first end of the fixing end 167 is inserted into the interior circumference of the elastic member 174, and thereby a second end of the fixing end 167 stably supports the elastic member 174.

In the drawings, each of the four first and second opening holes 138 and 154, the bypass holes 142, and the flow holes 158 are formed at 90$^{\circ}$ along the circumferential direction and the three penetration holes 168 are formed at 120$^{\circ}$ along the circumferential direction. However they are not limited thereto, and on the contrary, positions and numbers of each of the first and second opening holes 138 and 154, the bypass hole 142, the flow hole 158, and the penetration hole 168 may be various.

A seal ring 176 may be disposed between the end cap 178 provided to the mounting portion 110 and the fixing member 134 of the outer case 132 for the operating fluid, for example the coolant, flowed within the housing 101 not to be leaked out except at the first outlet 107, and further not to be leaked out between the end cap 178 and the fixing member 134.

That is, the seal ring 176 seals between the exterior circumference of the fixing member 134 and the end cap 178 provided to the mounting portion 103, and thereby prevents the coolant from leaking along the exterior circumference of the fixing member 134 of the outer case 132.

Figure 9:
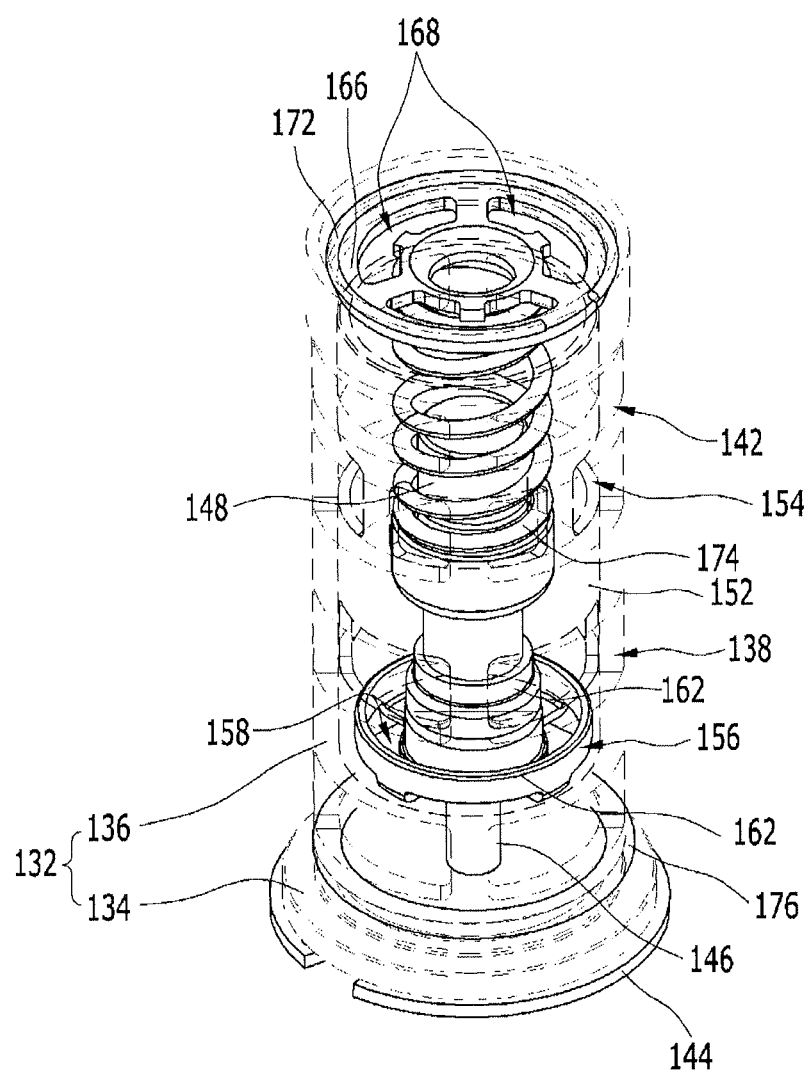
FIG. 9 is a drawing for describing operation of a valve unit applied to a can-type heat exchanger according to an exemplary embodiment of the present invention.

FIG. 9 is a drawing for describing operation of a valve unit applied to a can-type heat exchanger according to the exemplary embodiment of the present invention.

As shown in FIG. 9, the coolant at a predetermined temperature flows through the first inlet 105, and then flows into the outer case 132 and the inner case 152 through the penetration hole 168 of the stopper 166.

Then, the deformable member 148 moves forward on the fixing rod 146 by the expansion of the wax material within the deformable member 148.

Thus, the flange member 156 fixed to the lower portion of the deformable member 148 moves forward together with the deformable member 148. Simultaneously, the inner case 152 slides toward the first inlet 105 with the flange member 156 within the outer case 132.

In this case, the elastic member 174 is compressed and simultaneously the bypass hole 142 is closed by the inner case 152.

The second opening holes 154 are positioned corresponding to the first opening holes 138. Simultaneously, the first opening holes 138 positioned at the fixing member 134 of the outer case 132 are opened by the rising inner case 152, and the coolant flows into the mounting space S of the housing 101 and passes through the first connecting lines 113*a*.

If the operating fluid with temperature below a predetermined temperature flows into the first inlet 105, the deformable member 148 moves downward on the fixing rod 146.

In this case, the elastic member 174 supplies elastic force to the deformable member 148 for the deformable member 148 to rapidly return to the original position.

Then the inner case 152 moves backward together with the flange member 156 fixed to the deformable member 148, and thus the bypass holes 142 are opened and simultaneously the first opening holes 138 are closed.

Hereinafter, functions and operations of the heat exchanger 100 according to the exemplary embodiment of the present invention will be described.

Figure 10:
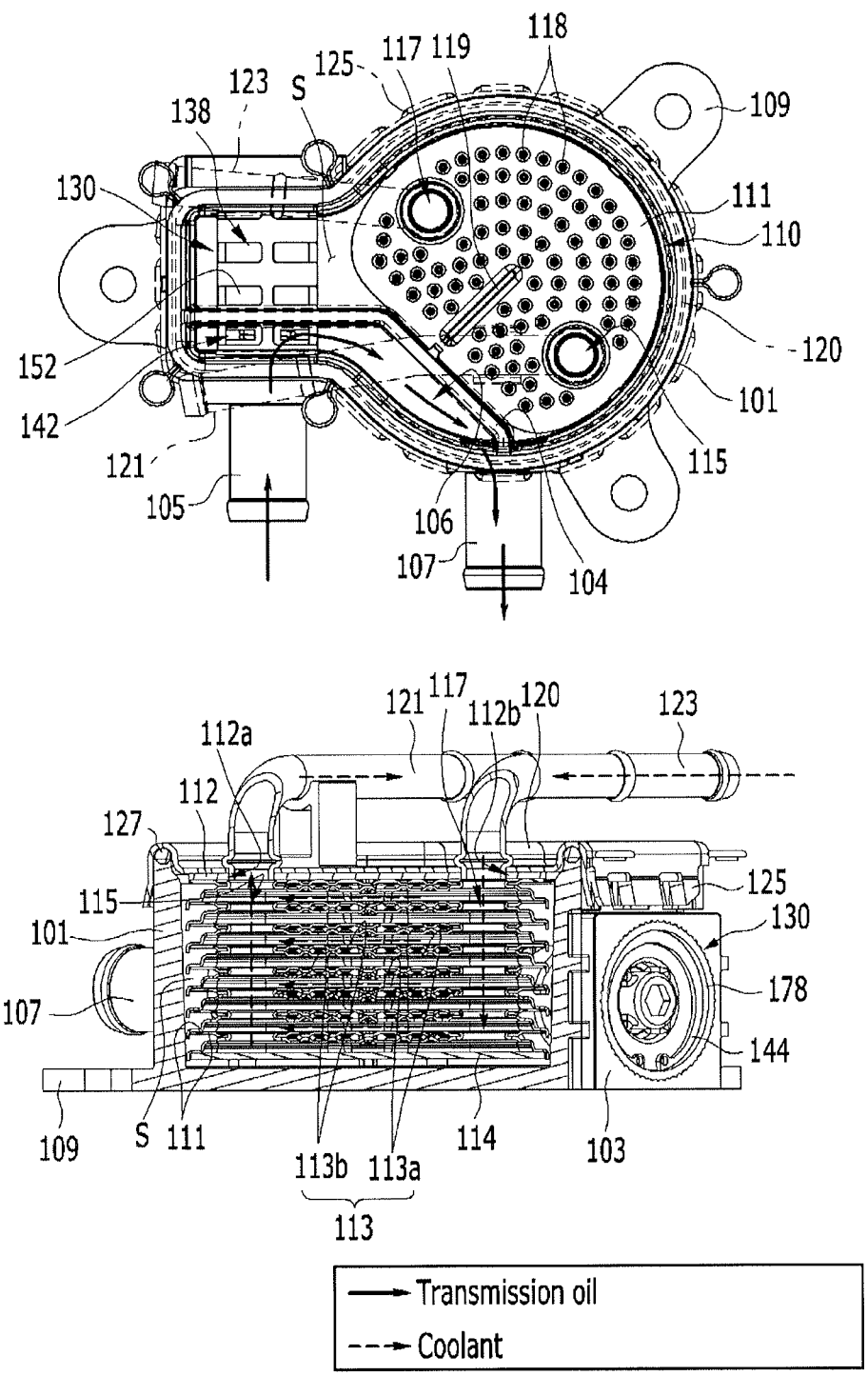
FIG. 10 and FIG. 11 are drawings for describing operation of a can-type heat exchanger for a vehicle according to an exemplary embodiment of the present invention.
Figure 11:
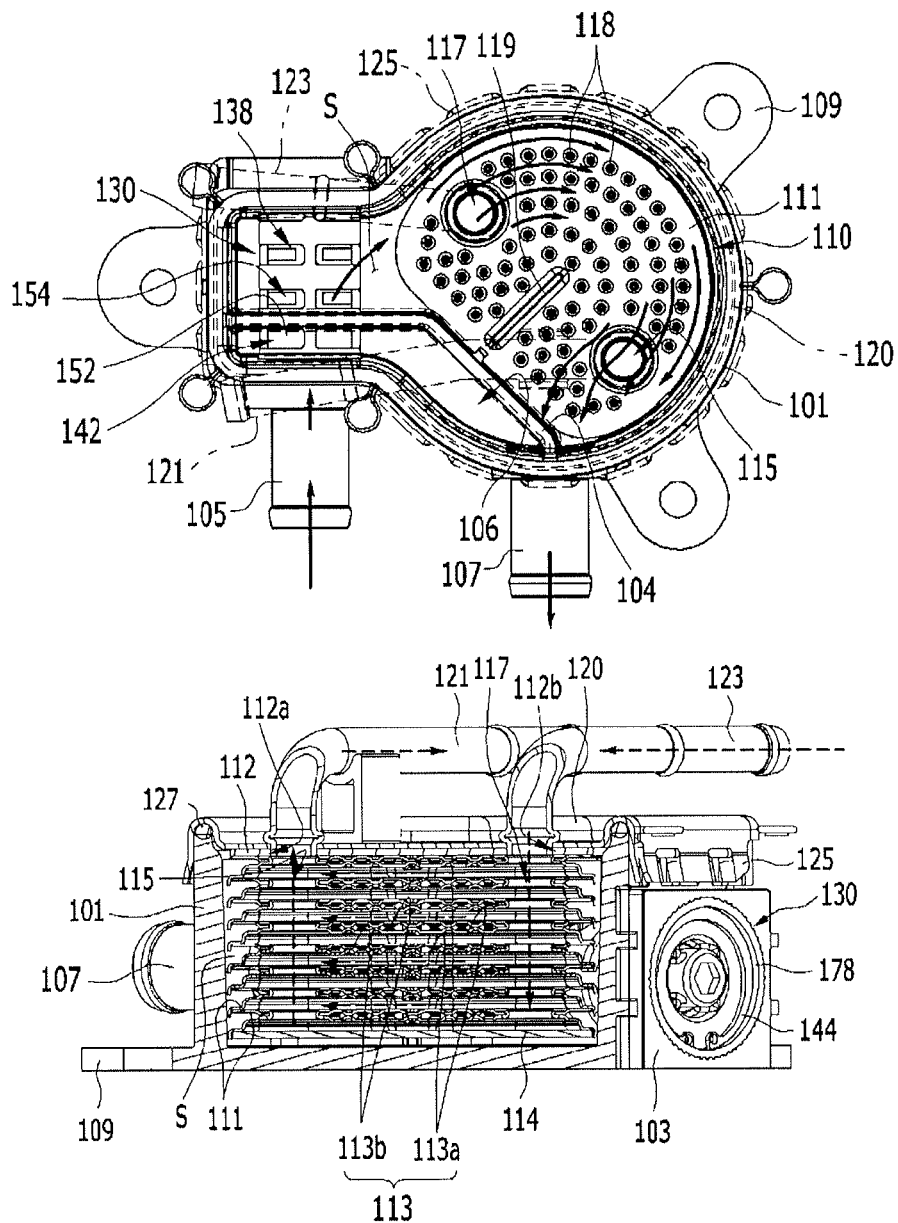

FIG. 10 and FIG. 11 are drawings for describing operation of a can-type heat exchanger for a vehicle according to the exemplary embodiment of the present invention.

As shown in FIG. 10, when the temperature of the coolant flowing into the first inlet 105 is lower than a predetermined temperature, the deformable member 148 maintains the initial position since the temperature of the coolant flowing into the penetration hole 168 of the stopper 166 is lower than a temperature at which the deformable member 148 is deformed.

Since the deformable member 148 does not move forward on the fixing rod 146, the inner case 152 further maintains the initial position (referring to FIG. 6), and the bypass hole 142 of the outer case 132 is opened.

As described above, since the closed portion when the inner case 152 closes the first opening holes 138 and the second opening holes 154 are positioned at the closed portion of the outer case 132, the outer case 132 and the inside of the inner case 152 are closed.

Thus, the coolant flowing into the housing 101 is prevented from flowing into the first connecting line 113*a*.

The coolant flows from the valve unit 130 through the opened bypass holes 142 and the bypass passageway 121 formed by the partition wall 104, and flows out through the first outlet 107. At this time, the coolant does not flow in the heat radiating unit 110.

Accordingly, the coolant does not flow into the first connecting line 113*a* of the heat radiating unit 110, so the coolant does not exchange heat with the transmission oil that flows through the second inlet 121 and passes through the second connecting line 113*b* of the heat radiating unit 110.

If the transmission oil and the engine oil should be warmed up according to a condition or a mode of the vehicle such as a running state, an idle mode, or initial starting, the bypass passageway 106 prevents the coolant of a low temperature from flowing into the first connecting line 113*a*. Therefore, the temperature of the transmission oil is prevented from being lowered through heat exchange with the coolant.

On the contrary, when the temperature of the coolant is higher than the predetermined temperature, the deformable member 148 of the valve unit 130 moves forward on the fixing rod 146 as shown in FIG. 11 by the coolant flowing through the penetration holes 168 of the stopper 166.

In this case, the flange member 156 moves forward together with the deformable member 148, and the inner case 152 moves toward the first inlet 105 within the outer case 132.

Referring to FIG. 9, the bypass hole 142 is closed by the closed end of the inner case 152, and the second opening holes 154 are positioned corresponding to the first opening holes 138. Therefore, the inside of the inner case 152 is opened.

Thus, the first and second opening holes 138 and 154 communicate the inside of the inner case 152 with the outside of the outer case 132, so the valve unit 130 is opened.

Then the coolant flowing into the valve unit 130, in a state that flowing into the bypass passageway 121 is prevented by closing the closed bypass hole 142, flows out through the first and second opening holes 138 and 154, the space S separated by the partition wall 104, the external side of the heat radiating unit 130, the first connecting line 113*a*, and the first outlet 107.

Thus, the coolant passes through the first connecting line 113*a* of the heat radiating unit 110 and exchanges heat with the transmission oil passing through the second inlet 121 and the second connecting line 113*b* within the space S of the housing 101. Therefore, the temperature of the transmission oil is adjusted.

The coolant and the transmission oil flow in different directions or opposite directions and exchange heat with each other because the first and second inlets 105 and 121 are formed to the lateral portion of the housing 101 and the one surface of the cover cap 120 in alternate directions. Therefore, the transmission oil exchanges heat with the coolant more efficiently.

Meanwhile, the transmission oil flows from the automatic transmission 40 into the second inlet 121, passes the second connecting line 113*b* of the heat radiating unit 110 in the space S of the housing 101, and flows out through the second outlet 123 to selectively exchange heat with the coolant by the operation of the valve unit 130.

Therefore, the transmission oil, the temperature of which is raised by operation of the automatic transmission 40, is cooled through heat exchange with the coolant in the heat radiating unit 110 of the can-type heat exchanger 100 and is then supplied to the automatic transmission 40.

That is, since the can-type heat exchanger 100 supplies the cooled transmission oil to the automatic transmission 40 rotating at a high speed, occurrence of slip in the automatic transmission 40 is prevented.

The deformable member 148 of the valve unit 130 moves forward or backward on the fixing rod 146 according to the temperature of the coolant to adjust the position of the inner case 152 and simultaneously closes or opens each of the first and second opening holes 138 and 154, thus the coolant flows through the bypass passageway 106 or the first and second opening holes 138 and 154. Accordingly, the can-type heat exchanger 100 according to the exemplary embodiment of the present invention may control flowing of the coolant passing through the can-type heat exchanger 100.

According to the present invention, the can-type heat exchanger 100 warms or cools operating fluids according to temperatures or flow amounts of the operating fluids flowing in a running state or an initial starting condition of the vehicle when the operating fluids are heat exchanged with each other in the can-type heat exchanger 100 through the valve unit 130 operated by the temperature of the operating fluids.

Further, it is possible to control the temperature of the operating fluids by an operation of the valve unit 130 according to the vehicle condition. Since the can-type heat exchanger 100 can control the temperature of the operating fluids and is formed with a can shape that can improve efficiency of heat exchange and reduce weight and size, and it is possible to simplify an engine layout. It may therefore be easy to obtain a mounting space and thereby installability may be improved.

The valve unit 130 applied with the deformable member 148 such as the wax material which is expanded or contracted according to the flowed operating fluid may selectively supply the operating fluids, thus flow of the operating fluids may be correctly controlled.

Since the valve unit 130 is mounted as the can-type heat exchanger 100, additional control valves and bifurcation circuits for controlling flow of the operating fluids may be eliminated. Therefore, manufacturing cost may be reduced and workability may be improved.

If the operating fluid is the transmission oil in the automatic transmission, hydraulic friction during cold starting may be lowered due to fast warm-up. In addition, slip may be prevented and durability may be maintained while driving due to excellent cooling performance. Therefore, fuel economy and durability of the transmission may be improved.

Further, since valve responsiveness of opening and closing according to the temperature of the operating fluids is improved, commercial value is improved.

In addition, manufacturing and assembly work may be simple, manufacturing cost may be reduced, and productivity may be improved as the cover cap 120 that the heat radiating unit 110 is integrally mounted to is coupled with the housing 101 which is manufactured by injection molding.

Furthermore, a defective complete product may not be produced such that commercial value is improved by checking whether a defective heat radiating unit 110 is produced before the cover cap 120 is assembled therewith.

For convenience in explanation and accurate definition in the appended claims, the terms "upper", "lower", "inner" and "outer" are used to describe features of the exemplary embodiments with reference to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A can-type heat exchanger comprising:
   a housing of which a first surface is opened and a second surface is closed and having a space therein, integrally formed with a mounting portion provided in a lateral side and communicated with the space, and a first inlet and a first outlet provided in the mounting portion and the lateral side thereof;
   a partition wall integrally formed to the housing, separating the space and an inside of the mounting portion, connected to the first inlet and the first outlet, and forming a bypass passageway inside of the housing;
   a heat radiating unit inserted into the space, provided with connecting lines alternately formed by stacking a plurality of plates, one of the connecting lines communicating with the space, and where operating fluids are heat-exchanged with each other while passing through the respective connecting lines;
   a cover cap mounted at the opened first surface of the housing so that the heat radiating unit integrally mounted on one surface thereof to the space, and a second inlet and a second outlet for communicating with the other connecting line of the connecting lines, are formed at the first surface; and
   a valve unit that is mounted at the first inlet formed in the mounting portion and penetrating the partition wall in the mounting portion, selectively opening and closing the space or the bypass passageway separated by the partition wall using linear displacement which is generated when expansion and contraction occur according to a temperature of the operating fluids flowing from the first inlet, and adjusting flow of the operating fluids.

2. The can-type heat exchanger of claim 1, wherein a coupling portion is integrally formed with an exterior circumference of the cover cap to be bent toward the housing.

3. The can-type heat exchanger of claim 2, wherein the coupling portion is clinching-coupled to the housing in a state that an interior circumference thereof is surrounded by an exterior circumference of the housing.

4. The can-type heat exchanger of claim 1, wherein a seal ring is disposed between the housing and the cover cap.

5. The can-type heat exchanger of claim 1, wherein
the first inlet and the first outlet are respectively formed at a position intersecting the second inlet and the second outlet.

6. The can-type heat exchanger of claim 1, wherein
the plates are formed with a disk shape corresponding to the housing, and a side corresponding to the partition wall is formed with a linear shape.

7. The can-type heat exchanger of claim 1, wherein
first and second connecting holes are formed to the plates corresponding to the second inlet and the second outlet.

8. The can-type heat exchanger of claim 7, wherein the heat radiating unit further comprises:
a first fixing plate being mounted to a first surface of the heat radiating unit which is fixed to the cover cap and forming first and second penetration holes which are formed to correspond with the first and second connecting holes; and
a second fixing plate mounted with a second surface of the heat radiating unit which is inserted into the space.

9. The can-type heat exchanger of claim 1, wherein the plates comprise:
a plurality of protrusions protruded from the plates to be disposed apart from each other by a set interval; and
a distributing protrusion formed from a center of the plates to an exterior circumference of the plates to be disposed between the first inlet and the first outlet.

10. The can-type heat exchanger of claim 9, wherein
the protrusions are formed with a hemisphere shape and are protruded from the plates in a same direction as the distributing protrusion.

11. The can-type heat exchanger of claim 1, wherein the valve unit comprises:
an outer case inserted into the first inlet from outside of the mounting portion, the outer case comprising a fixing portion of which a mounting groove is integrally formed to an interior surface of the first inlet thereof, and is mounted to an external side of the mounting portion at an opposite side of the first inlet, an insert portion integrally formed to the fixing portion, at least one first opening hole formed along a length direction corresponding to the space separated by the partition wall, and at least one bypass hole formed corresponding to the bypass passageway;
a fixing rod which is inserted into the outer case and of which a first end is fixedly mounted to the mounting groove of the fixing portion;
a deformable member inserted to the fixing rod, and moved on the fixing rod by expansion or contraction according to a change of temperature of the operating fluids;
an inner case of which at least one second opening hole is formed along a length direction thereof corresponding to the at least one first opening hole of the outer case, and which is slidably inserted into the outer case;
a flange member which is fixed to a first end of the inner case therein, and fixed to a lower portion of the deformable member;
a stopper fixed to the insert portion from an opposite side of the fixing portion of the outer case; and
an elastic member disposed between the deformable member and the stopper, that is compressed when the deformable member is expanded, and that supplies elastic force to the deformable member.

12. The can-type heat exchanger of claim 11, wherein
the fixing portion of the outer case is fixed to an end cap, which is mounted to the mounting portion on an external surface of the fixing portion.

13. The can-type heat exchanger of claim 11, wherein
the outer case is formed with a cylinder shape of which the first end is opened.

14. The can-type heat exchanger of claim 11, wherein
the at least one bypass hole and the at least one first opening hole are formed apart from each other along the length direction of the outer case at a predetermined angle.

15. The can-type heat exchanger of claim 11, wherein
the at least one first opening hole is formed apart from the bypass hole at the lower portion of the outer case along the length direction of the outer case toward the fixing portion.

16. The can-type heat exchanger of claim 11, wherein
the inner case is formed with a cylinder shape of which both ends are opened.

17. The can-type heat exchanger of claim 11, wherein
the at least one second opening hole is formed to be misaligned along the length direction of the inner case at a predetermined angle from each other.

18. The can-type heat exchanger of claim 11, wherein
the inner case is moved toward the first inlet by expansion of the deformable member in the outer case so that the at least one second opening hole is positioned at the at least one first opening hole to open the at least one first opening hole and close the bypass hole by the inner case.

19. The can-type heat exchanger of claim 11, wherein
the inner case is initially assembled as the at least one first opening hole is closed by the inner case and the at least one second opening hole is closed by the outer case.

20. The can-type heat exchanger of claim 11, wherein
a deformable material filled within the deformable member is made of a wax material which is expanded or contracted according to the temperature of the operating fluids.

21. The can-type heat exchanger of claim 11, wherein
flowing holes are formed to an exterior circumference of the flange member with a predetermined angle.

22. The can-type heat exchanger of claim 11, wherein
an exterior circumference of the flange member is fixed to an interior circumference of the inner case, and a connecting portion formed to the center thereof is fixed to the deformable member through a fixing ring.

23. The can-type heat exchanger of claim 11, wherein
at least one inflow hole is formed to the stopper for the operating fluid flowing through the first inlet to flow within the valve unit.

24. The can-type heat exchanger of claim 23, wherein
the inflow holes are formed to a center and along a circumference of the stopper.

25. The can-type heat exchanger of claim 11, wherein
a fixing end is formed to protrude to the stopper for the elastic member to be fixed at the stopper.

26. The can-type heat exchanger of claim 11, wherein
a receiving end, where the stopper is received, is formed to an interior circumference of the insert portion of the outer case.

27. The can-type heat exchanger of claim 26, wherein
a ring groove is formed to an interior circumference of the outer case for a stopper ring to be received thereto for fixing the stopper.

28. The can-type heat exchanger of claim 1, wherein
one of the operating fluids is a coolant flowing from a radiator, and another one of the operating fluids is a transmission oil from an automatic transmission.

29. The can-type heat exchanger of claim 28, wherein
the coolant is flowed to the heat radiating unit through the first inlet and the first outlet, the transmission oil is flowed to the heat radiating unit through the second inlet and the second outlet, and
the connecting lines comprise a first connecting line in which the coolant flows and a second connecting line in which the transmission oil flows.

30. The can-type heat exchanger of claim 1, wherein
a first end of the partition wall positioned at the space is bent at a predetermined angle from a second end of the partition wall positioned at the mounting portion.

31. The can-type heat exchanger of claim 1, wherein
a penetration hole is formed at a first end portion of the partition wall corresponding to the heat radiating unit.

32. The can-type heat exchanger of claim 1, wherein
the housing is formed with a cylinder shape, and is made of a plastic material through injection molding.

33. The can-type heat exchanger of claim 1, wherein
the cover cap is made of a metal material, and the heat radiating unit is integrally mounted to the cover cap by brazing.

* * * * *